United States Patent
Lin

(10) Patent No.: US 8,622,630 B2
(45) Date of Patent: Jan. 7, 2014

(54) OPTICAL FIBER CONNECTOR

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 381 days.

(21) Appl. No.: 12/969,428

(22) Filed: Dec. 15, 2010

(65) Prior Publication Data

US 2012/0114287 A1    May 10, 2012

(30) Foreign Application Priority Data

Nov. 9, 2010    (TW) ................................ 99138415 A

(51) Int. Cl.
*G02B 6/36*    (2006.01)
(52) U.S. Cl.
USPC ........................................................... 385/77
(58) Field of Classification Search
USPC ........................................................... 385/77
See application file for complete search history.

(56) References Cited

U.S. PATENT DOCUMENTS 6,659,654 B2 *    12/2003    Kao ................................ 385/78

FOREIGN PATENT DOCUMENTS

JP    2002090584 A *    3/2002

\* cited by examiner

*Primary Examiner* — Ryan Lepisto
*Assistant Examiner* — Erin Chiem
(74) *Attorney, Agent, or Firm* — Altis Law Group, Inc.

(57) ABSTRACT

An optical fiber connector includes a coupling portion. The coupling portion includes a first end surface and an opposite second end surface. The first end surface includes a number of lenses arranged thereat and a number of engaging holes formed therein. The second end surface includes a number of optical fiber holes formed therein and aligned with the respective lenses, and a number of posts formed thereon. Each of the posts has a spring member arranged thereon.

15 Claims, 4 Drawing Sheets

OPTICAL FIBER CONNECTOR

BACKGROUND

1. Technical Field

The present disclosure relates to optical fiber connectors.

2. Description of Related Art

Optical fiber connectors are widely used in optical fiber communication. Some optical fiber connectors include at least one optical fiber hole and one lens aligned with the hole. The optical fiber connector may be connected to another optical fiber connector or a device. Connecting optical fiber connectors can be difficult, and users may use too much force and damage the connectors.

What is needed, therefore, is an optical fiber connector which can overcome the above shortcomings.

BRIEF DESCRIPTION OF THE DRAWINGS

Many aspects of the present optical fiber connector can be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

DETAILED DESCRIPTION

Embodiments of the present optical fiber connector will now be described in detail below and with reference to the drawings.

Figure 1:
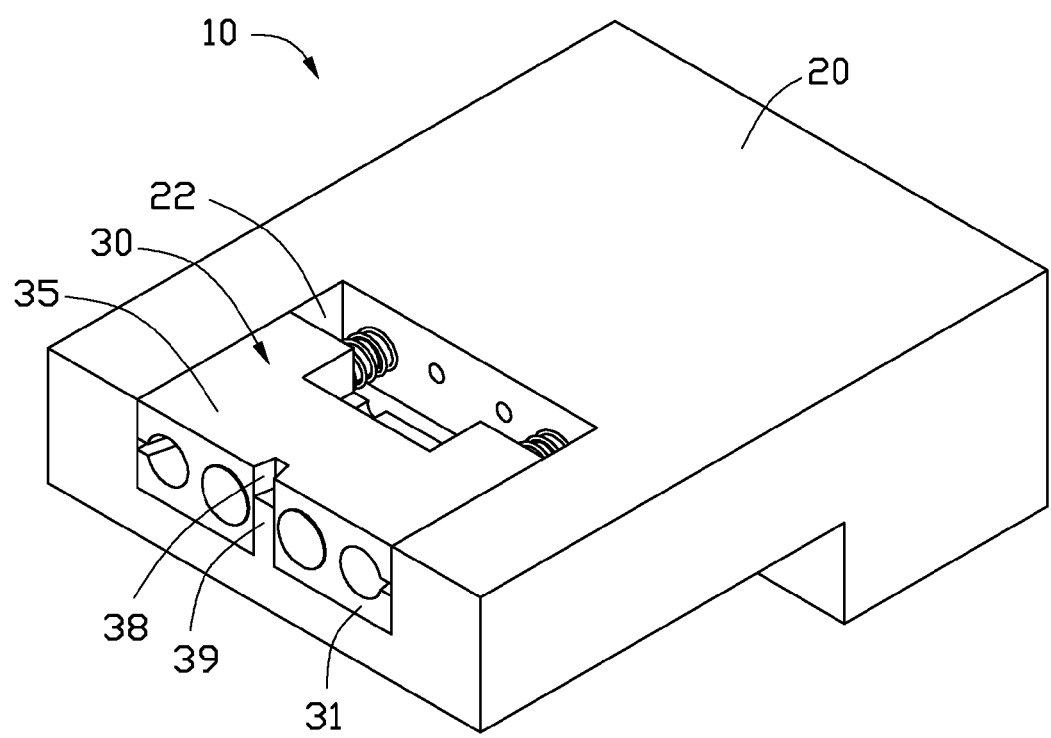
FIG. 1 is an isometric view of an optical fiber connector in accordance with a first embodiment.
Figure 2:
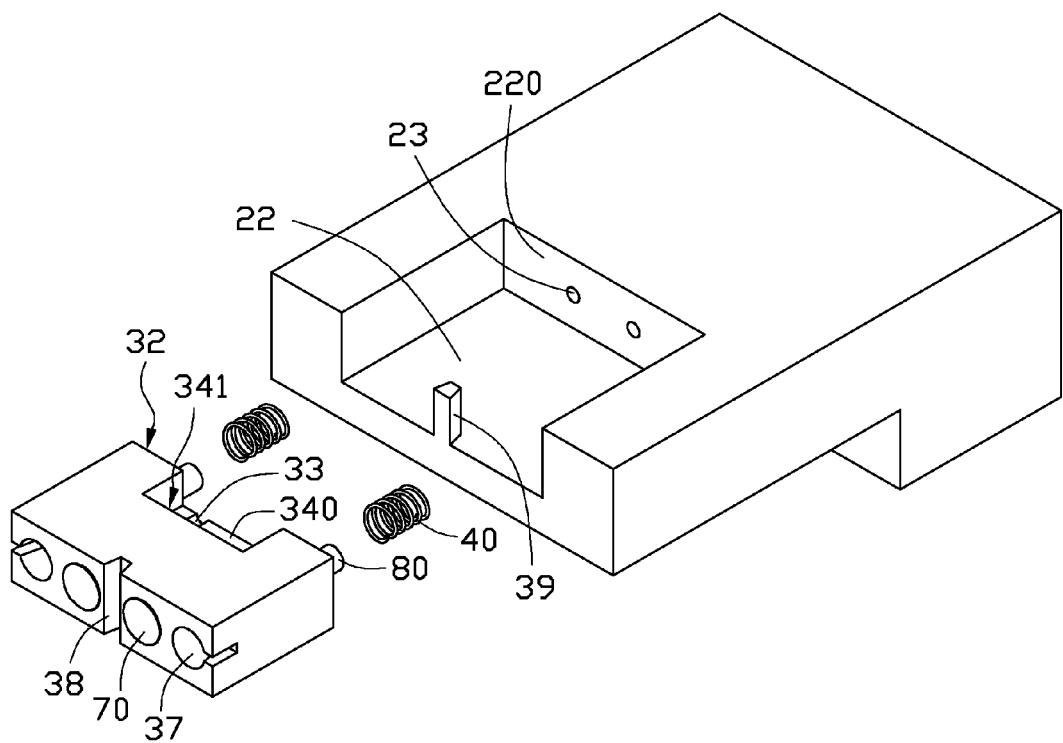
FIG. 2 is an exploded isometric view of the optical fiber connector of FIG. 1, the optical fiber connector including a coupling portion.
Figure 3:
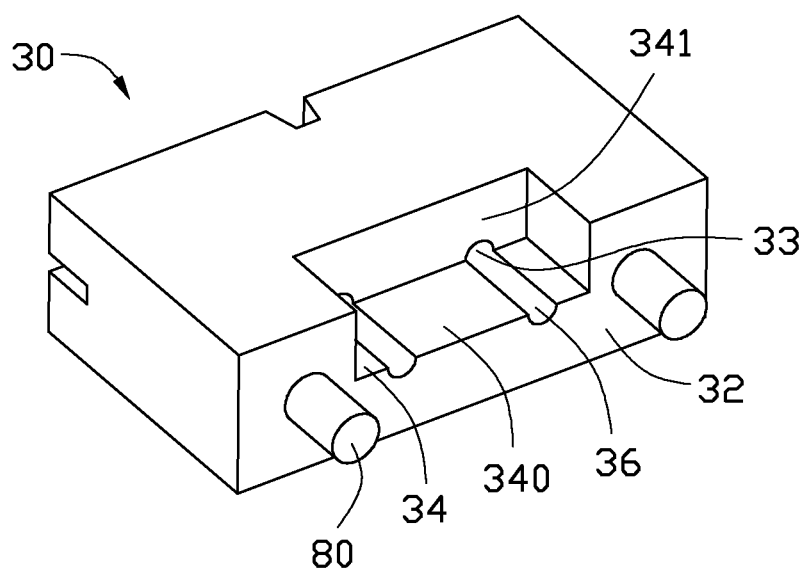
FIG. 3 is another isometric view of the coupling portion of the optical fiber connector shown in FIG. 2.

Referring to FIGS. 1 to 3, an optical fiber connector 10 in accordance with a first embodiment is provided. The optical fiber connector 10 includes a sheath 20 and a coupling portion 30. The sheath 20 includes a recess 22 formed therein, and the coupling portion 30 is received in the recess 22.

The sheath 20 includes a plurality of through holes 23 defined therein from a back outside surface through to an inner surface 220 of the recess 22, i.e, the through holes 23 are exposed in the recess 22. The inner surface 220 is a flat surface. The through holes 23 are configured for receiving and guiding optical fibers (not shown) to the coupling portion 30. In the illustrated embodiment, the number of the through holes 23 is two. The sheath 20 further includes a pole 39 formed in a front end thereof across the recess 22 from a bottom surface of the recess 22.

The coupling portion 30 includes a first end surface 31, a second end surface 32 opposite to (i.e, facing away from) the first end surface 31, and a top surface 35 perpendicularly interconnecting the first end surface 31 and the second end surface 32. When the coupling portion 30 is received in the recess 22, the first end surface 31 is exposed to outside. The first end surface 31 has a groove 38 formed therein, and the pole 39 is engaged in the groove 38. In the illustrated embodiment, the groove 38 is formed along a central axis of the first end surface 31.

The first end surface 31 further includes a plurality of engaging structures formed therein, to be engaged with another optical fiber connector or a device. In the illustrated embodiment, the first end surface 31 includes two engaging holes 37 serving as the engaging structures. The engaging holes 37 are symmetrical about the central axis of the first end surface 31, and are arranged adjacent to two sides of the coupling portion 30, respectively. In this embodiment the other optical fiber connector or device which is coupled to the optical fiber connector 10 includes two protrusions to be engaged in the engaging holes 37.

The first end surface 31 further includes two lenses 70 arranged thereat. In the present embodiment, the lenses 70 are integrally formed on the first end surface 31. The lenses 70 are also symmetrical about the central axis of the first end surface 31, and are arranged adjacent to the groove 38.

The second end surface 32 has a recess 34 formed in a central area thereof, and the recess 34 is exposed to the top surface 35. A bottom surface 340 of the recess 34 is parallel with the top surface 35, and an inner surface 341 of the recess 34 opposes both the first and second end surfaces 31, 32. A plurality of optical fiber guiding grooves 36 corresponding to the through holes 23 are formed in the bottom surface 340, and corresponding blind holes 33 are formed in the inner surface 341. The blind holes 33 are aligned with the lenses 70, respectively. When the coupling portion 30 is received in the recess 22, optical fibers (not shown) from the through holes 23 can insert into the blind holes 33 through the guiding grooves 36. The recess 34 exposes part of the optical fibers, such that adhesive can be applied in the recess 34 to fix the optical fibers in position.

Two posts 80 are formed on the second end surface 32. The posts 80 are symmetrical about a central axis of the second end surface 32, and are arranged adjacent to the recess 34. Two spring members 40 surround the respective posts 80, and one end of each of the spring members 40 can be fixed to the corresponding post 80. When the coupling portion 30 is received in the recess 22, the spring members 40 elastically contact the second end surface 32 and the inner surface 220. In the present embodiment, the spring members 40 are coil springs and are in a compressed state. The pole 39 prevents the coupling portion 30 from escaping out from the recess 22.

The spring members 40 allow adjustments to the position of the coupling portion 30, such that, when the other optical fiber connector or device is coupled to the coupling portion 30, the coupling portion 30 can be easily and quickly engaged with the other optical fiber connector or device without any damage to the coupling portion 30.

Figure 4:
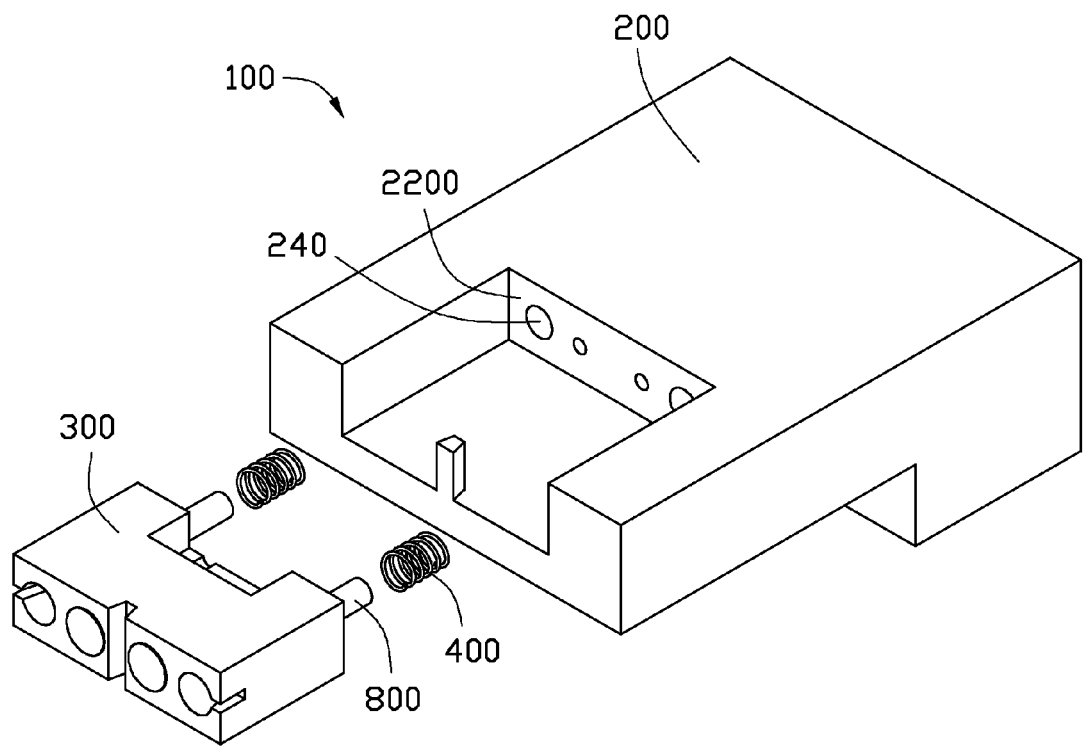
FIG. 4 is an isometric view of an optical fiber connector in accordance with a second embodiment.

Referring to FIG. 4, an optical fiber connector 100 in accordance with a second embodiment is provided. The optical fiber connector 100 is essentially similar to the optical fiber connector 10 illustrated above, except that an inner surface 2200 of a sheath 200 of the optical fiber connector 100 has two receiving holes 240 formed therein, and each of the receiving holes 240 is configured to receive a spring member 400 and a post 800 of the coupling portion 300 and guide movement of the spring member 400 and the post 800.

In other embodiments, the sheath of the optical fiber connector illustrated above can be replaced by a shell of a device. That is, the coupling portion can directly be elastically connected to a device with actions of the spring members, and the optical fibers can just be received in the guiding groove and optical fiber blind hole of the coupling portion.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
a sheath comprising a first recess formed therein and a pole;
a coupling portion detachably received in the first recess of the sheath, the coupling portion comprising a first end surface having a plurality of lenses arranged therein, and a groove defined in a center portion of the first end surface, and an opposing second end surface having a plurality of optical fiber holes formed therein and aligned with the respective lenses; and
a plurality of spring members arranged between the second end surface and an inner surface of the sheath in the first recess, one end of each of the spring members abutting against the second end surface, and an opposite end of each of the spring members abutting against the inner surface of the sheath in the first recess;
wherein the pole slidably engages in the groove.

2. The optical fiber connector of claim 1, wherein the second end surface of the coupling portion comprises a plurality of posts formed thereon, and the spring members surround the respective posts.

3. The optical fiber connector of claim 2, wherein the sheath comprises a plurality of receiving holes formed in the inner surface in the first recess, the receiving holes receiving the posts and the spring members therein.

4. The optical fiber connector of claim 1, wherein the coupling portion comprises a second recess formed therein, and the optical fiber holes are exposed in the second recess.

5. The optical fiber connector of claim 1, wherein the sheath comprises a plurality of optical fiber holes formed therein, and the optical fiber holes are exposed in the first recess.

6. The optical fiber connector of claim 1, wherein the first end surface further has a plurality of engaging holes formed therein.

7. The optical fiber connector of claim 1, wherein the pole extends from a bottom surface of the first recess at a front end of the first recess, and the groove is formed in the first end surface along a central axis of the first end surface.

8. The optical fiber connector of claim 7, wherein each of the spring members is a coil spring, the spring member is compressed between the second end surface and the inner surface of the sheath in the first recess, and the pole is configured for preventing the coupling portion from escaping out from the first recess.

9. An optical fiber connector comprising:
a sheath comprising a first recess formed therein and a pole;
a coupling portion received in the first recess of the sheath, the coupling portion comprising a first end surface having a plurality of lenses arranged therein, and a groove defined in a center portion of the first end surface, and an opposing second end surface, the second end surface comprising a second recess formed therein, and a plurality of optical fiber holes formed in an inner surface thereof of the coupling portion in the second recess and aligned with the respective lenses; and
a plurality of spring members arranged between the second end surface and an inner surface of the sheath in the first recess, one end of each of the spring members abutting against the second end surface, and an opposite end of each of the spring members abutting against the inner surface of the sheath in the first recess wherein the pole slidably engages in the groove.

10. The optical fiber connector of claim 9, wherein the second end surface comprises a plurality of posts formed thereon, and the spring members surround the respective posts.

11. The optical fiber connector of claim 10, wherein the sheath comprises a plurality of receiving holes formed in the inner surface thereof in the first recess, the receiving holes receiving the posts and the spring members therein.

12. The optical fiber connector of claim 9, wherein a bottom surface of the second recess comprises a plurality of guiding grooves formed therein, and the guiding grooves are aligned with the respective optical fiber holes.

13. The optical fiber connector of claim 9, wherein the first end surface further has a plurality of engaging holes formed therein.

14. The optical fiber connector of claim 9, wherein the pole extends from a bottom surface of the first recess at a front end of the first recess, and the groove is formed in the first end surface along a central axis of the first end surface.

15. The optical fiber connector of claim 14, wherein each of the spring members is a coil spring, the spring member is compressed between the second end surface and the inner surface of the sheath in the first recess, and the pole is configured for preventing the coupling portion from escaping out from the first recess.

* * * * *